(12) United States Patent
Fong

(10) Patent No.: US 12,724,645 B2
(45) Date of Patent: Sep. 1, 2026

(54) VIRTUALIZED COMPUTING RESOURCE MANAGEMENT FOR MACHINE LEARNING MODEL-BASED PROCESSING IN COMPUTING ENVIRONMENT

(71) Applicant: Dell Products L.P., Round Rock, TX (US)

(72) Inventor: Victor Fong, Melrose, MA (US)

(73) Assignee: Dell Products L.P., Round Rock, TX (US)

(*) Notice: Subject to any disclaimer, the term of this patent is extended or adjusted under 35 U.S.C. 154(b) by 967 days.

(21) Appl. No.: 17/681,288

(22) Filed: Feb. 25, 2022

(65) Prior Publication Data

US 2023/0273837 A1 Aug. 31, 2023

(51) Int. Cl.
*G06F 9/50* (2006.01)
*G06F 9/455* (2018.01)
*G06N 5/02* (2023.01)

(52) U.S. Cl.
CPC ........ *G06F 9/5077* (2013.01); *G06F 9/45558* (2013.01); *G06N 5/027* (2013.01); *G06F 2009/4557* (2013.01)

(58) Field of Classification Search
None
See application file for complete search history.

(56) References Cited

U.S. PATENT DOCUMENTS 9,891,954 B2 * 2/2018 Antony ................. G06F 9/5016
9,971,621 B1 * 5/2018 Berg ..................... G06F 9/5077
10,628,195 B2 * 4/2020 Miller ................. G06F 9/45558
11,373,119 B1 * 6/2022 Doshi ..................... H04L 47/70
11,900,174 B2 * 2/2024 Hou ....................... G06F 9/3877
12,219,057 B2 * 2/2025 Rogers ....................... H04L 9/30
12,443,425 B1 * 10/2025 Raslan ................ G06F 9/44594
2008/0177424 A1 * 7/2008 Wheeler ............... G06F 9/5077 700/295
2008/0201711 A1 * 8/2008 Amir Husain ...... H04L 65/1069 718/1
2012/0011509 A1 * 1/2012 Husain .................. G06F 9/5088 718/1

(Continued)

OTHER PUBLICATIONS

L. Wang et al., "Peeking Behind the Curtains of Serverless Platforms," USENIX Annual Technical Conference, Jul. 2018, 13 pages.

(Continued)

*Primary Examiner* — Hiren P Patel
(74) *Attorney, Agent, or Firm* — Ryan, Mason & Lewis, LLP

(57) ABSTRACT

Techniques are disclosed for virtualized computing resource management for machine learning model-based processing in a computing environment. For example, a method maintains one or more virtualized computing resources, wherein each of the one or more virtualized computing resources is created and one or more initializations are caused to be performed. After creation and performance of the one or more initializations, each of the one or more virtualized computing resources is placed in an idle state. The method then receives a machine learning model-based request, and removes at least one of the one or more virtualized computing resources from the idle state to process the machine learning model-based request.

20 Claims, 8 Drawing Sheets

(56) References Cited

U.S. PATENT DOCUMENTS

2013/0179895 A1* 7/2013 Calder .................. G06F 9/5077 718/104
2014/0096132 A1* 4/2014 Wang .................... G06F 9/4552 718/1
2016/0092250 A1* 3/2016 Wagner ............... G06F 9/44536 718/1
2016/0103698 A1* 4/2016 Yang ..................... G06F 9/5022 718/1
2016/0150053 A1* 5/2016 Janczuk ................ H04L 67/561 709/217
2017/0322834 A1* 11/2017 de Sene ................ G06F 9/5066
2019/0155633 A1* 5/2019 Faulhaber, Jr. .......... G06N 5/04
2019/0156244 A1* 5/2019 Faulhaber, Jr. ....... G06F 9/5072
2020/0026576 A1* 1/2020 Kaplan ............... G06F 16/2282
2020/0027210 A1* 1/2020 Haemel ................... G06F 9/547
2020/0183723 A1* 6/2020 Sabev ................... G06F 9/5077
2020/0311617 A1* 10/2020 Swan .................... G06F 9/5077
2021/0125104 A1* 4/2021 Christiansen .......... G06N 20/10
2022/0188138 A1* 6/2022 Akkur Rajamannar ..................... G06F 9/45558
2022/0206873 A1* 6/2022 He ........................ G06F 9/4881
2022/0237505 A1* 7/2022 Feldman ............. G06F 9/45558
2022/0261631 A1* 8/2022 Cohen .................... G06N 20/00
2022/0311594 A1* 9/2022 Kadam ..................... H04L 9/40
2022/0318647 A1* 10/2022 Ashrafzadeh ............ G06N 5/04
2022/0342649 A1* 10/2022 Cao ........................... G06F 8/61
2022/0342714 A1* 10/2022 Lincourt, Jr. ......... G06F 9/5061
2022/0382601 A1* 12/2022 Feldman ............... G06F 9/5083
2022/0414503 A1* 12/2022 Park ...................... G06F 9/4881
2023/0273837 A1* 8/2023 Fong ..................... G06F 9/5072 718/1
2024/0171657 A1* 5/2024 Sharma Banjade .... H04L 67/61
2024/0256313 A1* 8/2024 Sanapo ..................... G06F 8/31

OTHER PUBLICATIONS

F. Romero et al., “INFaaS: Automated Model-less Inference Serving,” USENIX Annual Technical Conference, Jul. 2021, 15, pages.
Wikipedia, “Edge Computing,” https://en.wikipedia.org/w/index.php?title=Edge_computing&oldid=1073476548, Feb. 22, 2022, 7 pages.
The Kubernetes Authors, “Cluster Architecture,” https://kubernetes.io/docs/concepts/architecture/_print/, Accessed Feb. 25, 2022, 23 pages.

* cited by examiner

| CONTAINER IMAGE | DESIRED NUMBER N IN POOL |
|---|---|
| TENSORFLOW 2.0 | 20 |
| TENSORFLOW 2.0 WITH GPU | 8 |
| PYTORCH | 13 |
| ...... | ...... |

VIRTUALIZED COMPUTING RESOURCE MANAGEMENT FOR MACHINE LEARNING MODEL-BASED PROCESSING IN COMPUTING ENVIRONMENT

FIELD

The field relates generally to information processing, and more particularly to management of information processing systems.

BACKGROUND

Machine learning (ML) application programs and microservices utilize ML models, which typically have a training mode and an inference mode. In the training mode, model parameters (sometimes also referred to as model hyperparameters) of the ML model are adjusted to optimize for accuracy. Once the ML model is trained with acceptable accuracy, it can then be used for the inference mode. The inference mode is the process of entering new input to the trained ML model, which then generates and outputs a prediction based on one or more pre-defined computations using the optimized parameters. This inference mode process is also referred to as inference serving. While inference serving using a trained ML model typically consumes fewer virtualized computing resources (e.g., containers, virtual machines, and the like) than the training mode, management of the virtualized computing resources can pose significant technical problems depending on the computing environment in which the inference serving functionality is deployed.

SUMMARY

Embodiments provide techniques for virtualized computing resource management for machine learning model-based processing in a computing environment.

For example, in one illustrative embodiment, a method maintains one or more virtualized computing resources, wherein each of the one or more virtualized computing resources is created and one or more initializations are caused to be performed. After creation and performance of the one or more initializations, each of the one or more virtualized computing resources is placed in an idle state. The method then receives a machine learning model-based request, and removes at least one of the one or more virtualized computing resources from the idle state to process the machine learning model-based request.

While techniques described herein are particularly well-suited for inference serving in an edge computing environment, embodiments are not limited thereto.

These and other illustrative embodiments include, without limitation, methods, apparatus, networks, systems and processor-readable storage media.

DETAILED DESCRIPTION

Figure 1:
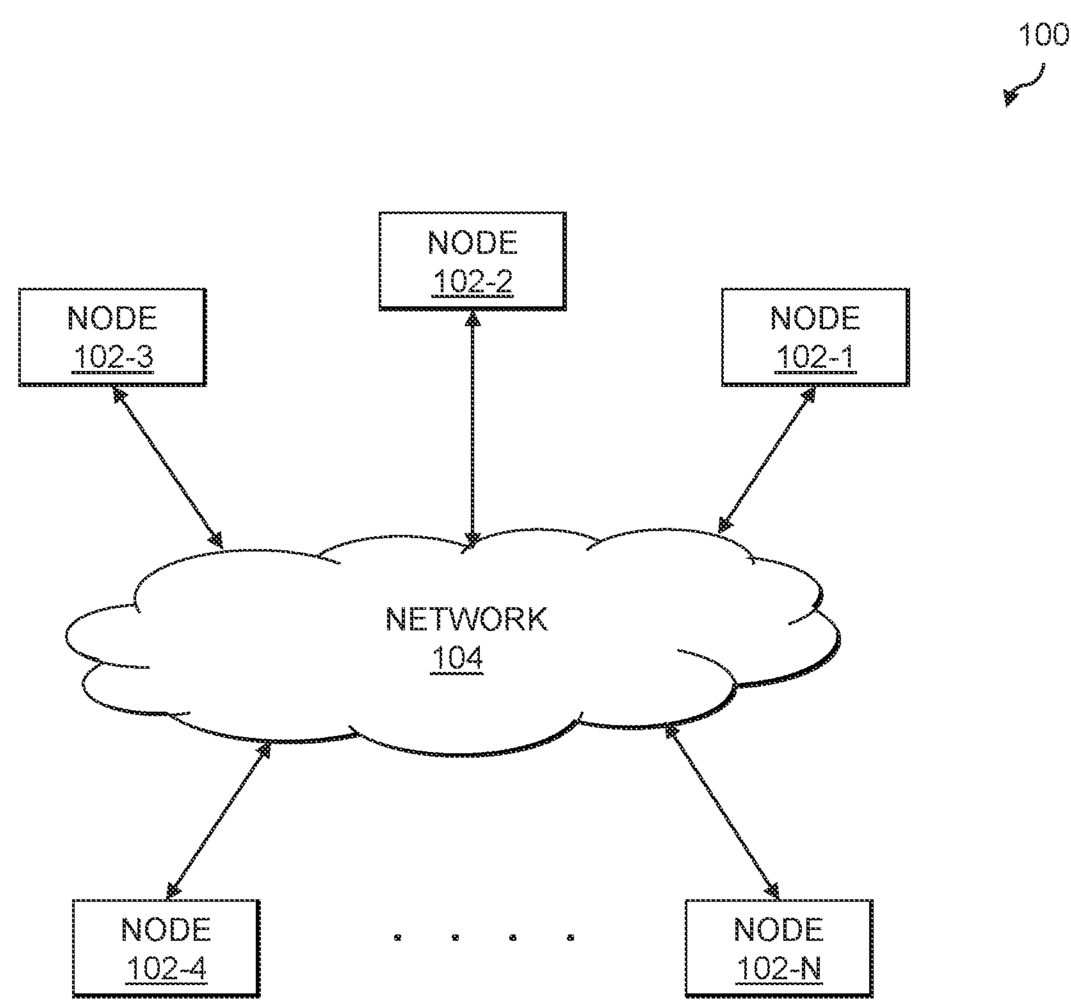
FIG. 1 illustrates a computing environment within which one or more illustrative embodiments can be implemented.

As mentioned, management of virtualized computing resources (e.g., containers, virtual machines, and the like) can pose significant technical problems depending on the computing environment in which inference serving functionality for an ML model is deployed. Currently, there are standards for defining ML models, computations and parameters in pre-defined file formats (e.g., Open Neural Network Exchange or ONNX), so that ML models of varied sizes can be processed in similar manners. As further mentioned above, inference serving refers to the process of accepting input, performing an inference computation based on the input, and responding with a computation result. It is realized herein that, aside from pre-processing input data, the core implementation of inference serving can be re-used for different applications and microservices. However, existing approaches for ML model processing have their own technical shortcomings, as will be explained below.

For example, consider a Function-as-a-Service (FaaS) execution environment for ML model processing, where FaaS workloads or functions are typically short-lived with the ability to scale down to zero instances. The lifecycle of a function can be measured in seconds. Some implementations have maximum execution times, e.g., about two minutes. These workloads are executed in isolated containers which are subject to cold-start times. Cold-start time refers to the time it takes to allocate and start the container from scratch, as will be further explained below.

Further, Inference-as-a-Service (INFaaS) refers to ML inference serving platforms that can provide a model-less experience to users, based on user-defined requirements such as cost, accuracy, and performance. However, current INFaaS platforms are cloud-based (i.e., implemented on a cloud computing platform) and do not take into account workload scheduling dimensions associated with edge computing platforms which can include heterogeneous execution environments, latencies, model transmissions, bandwidths, etc.

As is known, edge computing is a distributed computing paradigm wherein data computation and/or data storage is performed at or close to a location where the data is produced. This is in comparison to cloud or core computing paradigms wherein data computation and/or data storage is performed at a more centralized location (e.g., data center) that is not necessarily at or close to the data source.

Still further, ML models such as deep neural network (DNN) models are available in different sizes (even ones with the same objective), i.e., different numbers of layers and parameters. There are several mechanisms to compress DNN models to reduce their sizes. DNN models of larger sizes require more computing resources and take longer to perform inference serving, but have greater accuracy over smaller-sized models. Model compression is typically a trade-off between size and accuracy.

Illustrative embodiments overcome the above and other technical problems associated with existing ML processing approaches by providing a cluster-less, server-less, and model-less INFaaS platform that can be used in computing environments including, but not limited to, edge, cloud, and core computing environments. Such a computing platform enables, inter alia, developers and data scientists to deploy new ML models or existing ML models, and specify execution requirements and service level agreements. Advantageously, the INFaaS platform is configured to select the appropriate ML model and execution environment.

Note that the terms server-less, model-less and cluster-less do not necessarily mean that servers, models and clusters (i.e., groups of computing nodes used to execute one or more workloads) are not used to execute a given application or microservice. Rather, the respective terms generally mean that a developer or data scientist need not be concerned with scaling of servers, models and clusters since those features are automatically or at least semi-automatically managed (abstracted) by the computing platform upon which the application or microservice is developed and/or deployed.

It is realized herein that illustrative embodiments overcome many technical problems attributable to implementing an INFaaS platform with cluster-less, server-less and model-less characteristics. More particularly, illustrative embodiments described herein provide techniques for reducing start times for inference serving containers (more generally, virtualized computing resources). It is to be understood that these technical problems are common between cloud/core computing platforms and edge computing platforms, although the distributed nature of an edge computing platform amplifies these technical problems with additional complexities. As such, virtualized computing resource management techniques described herein can be applied to edge computing environments, cloud/core computing environments, combinations thereof, as well as other computing environments.

One technical problem that the development of an INFaaS platform with cluster-less, server-less and model-less characteristics faces is resource consumption associated with inference serving. It is realized herein that a significant amount of existing inference serving code is implemented as long-running microservices. Throughout the lifetime of these microservices, resources are actively being occupied, such as accelerators and memory space. Accelerators are processing devices that assist other processing devices, such as central processing units (CPUs), by providing additional computation capabilities. Non-limiting examples of accelerators include graphical processing units (GPUs), field-programmable gate arrays (FPGAs), and artificial intelligence chips (AI-Chips). Such accelerators, consistent with the name, speed up computations in a computing platform.

Another technical problem that the development of an INFaaS platform with cluster-less, server-less and model-less characteristics faces is the cold-start time associated with inference serving containers. In general, the cold-start time of containers in server-less environments is a useful metric and a continuous management issue.

In general, the cold-start process goes through the following steps: (i) container start trigger; (ii) container image download; (iii) container image extraction; (iv) container process initialization on the operating system of the computing platform, e.g., initializing control groups (cgroups) in a Linux kernel; and (v) container process execution to a point where it is ready to serve. After step (v), the serving function is ready to be invoked with input data. Computation can then be executed.

In a server-less environment providing DNN inference functionality, additional steps are needed to cold-start an inference serving container. Accordingly, the above steps are expanded as follows: (i) container start trigger; (ii) container image download; (iii) container image extraction; (iv) container process initialization on the operating system; (v) DNN model download and extraction; (vi) DNN framework initialization (e.g., Tensorflow, Pytorch, etc.); (vii) accelerator initialization (e.g., CUDA_INIT, etc.); (viii) DNN model import into the DNN framework; and (ix) ready to accept input and start serving.

Based on experiment, without any optimization, the expanded cold-start process can take about 900 milliseconds for a serving function written in Tensorflow for Golang. Other programming languages, such as C, Python and Java, have similar or greater levels of overhead. Initializing a GPU also adds, on average, about 860 milliseconds to the overall cold-start processing, further pushing the cold-start time to about 1800 milliseconds. The above-mentioned experiment was based on having the container image and DNN model pre-downloaded, bypassing steps (ii), (iii) and (vi), because download speed depends on bandwidth and latency of network.

Accordingly, illustrative embodiments provide techniques to manage (or otherwise maintain) containers by creating the containers and performing one or more initializations and/or other steps of the cold-start process in advance of a given trigger such as, for example, receipt of an inference request. As such, a set of one or more containers are "warmed-up" and ready as stand-by containers in a pool (stand-by referring to an idle state, as will be further explained herein) for rapid use once the trigger is invoked. Among other technical advantages, these warm-up and container pooling techniques reduce the time to handle inference serving requests for an INFaaS platform.

Referring initially to FIG. 1, a computing environment 100 is depicted within which one or more illustrative embodiments can be implemented. As generally shown, a plurality of nodes 102-1, 102-2, 102-3, 102-4, . . . , 102-N (which may hereinafter be referred to collectively as nodes 102, and individually as node 102) are operatively coupled to one another via a network 104.

In some embodiments, computing environment 100 may be an exemplary information processing system with associated computers, servers, storage devices and other processing or computing devices. Each node 102 may be one or more of the above types of processing or computing devices. It is to be appreciated, however, that embodiments are not restricted to use with any particular system and/or device configurations. Accordingly, the term "information processing system" as used herein is intended to be broadly construed, so as to encompass, for example, processing systems comprising computing and storage systems, as well as other types of processing systems comprising various combinations of physical and virtual processing resources.

For example, an information processing system may comprise at least one data center or other type of cloud-based system that includes one or more clouds hosting tenants that access cloud resources. Such a system may also be referred to as a core system. Alternatively, an information processing center may comprise an edge-based system that includes one or more edge computing platforms with edge devices and/or edge gateways that operate in accordance with an edge computing paradigm. Still further, embodiments may comprise a combination of cloud/core-based devices and edge-based devices, and/or other types of computing devices. Nodes 102 in computing environment 100 are intended to represent any one or more of the types of devices illustratively mentioned above, as well as other types of devices.

For example, nodes 102 may comprise client devices, e.g., physical computing devices such as Internet of Things (IoT) devices, mobile telephones, laptop computers, tablet computers, desktop computers or other types of devices utilized by members of an enterprise, in any combination. Such devices are examples of what are more generally referred to herein as processing devices. Some of these processing devices are also generally referred to herein as computers or computing devices. The client devices may also or alternately comprise virtualized computing resources, such as virtual machines (VMs), containers, etc. The client devices in some embodiments comprise respective computers associated with a particular company, organization or other enterprise. In addition, at least portions of computing environment 100 may also be referred to herein as collectively comprising an enterprise. Numerous other operating scenarios involving a wide variety of different types and arrangements of processing nodes are possible, as will be appreciated by those skilled in the art.

Still further, nodes 102 may comprise mini-computers. A mini-computer may be implemented as a single-board computer (SBC), a computer-on-module (COM) or system on a module (SOM), an embedded computer system, a system on chip (SoC), a system in a package (SiP), an integrated circuit, a hardware accelerator, etc. A mini-computer illustratively has its own process and memory space, and is capable of executing an operating system (OS) in a standalone fashion (e.g., separate from a host OS that runs or executes on a client device).

Nodes 102 may take on various form factors. For example, in some embodiments, nodes 102 may be implemented as embedded components of client devices. In other embodiments, nodes 102 may be implemented as external pluggable devices. In still other embodiments, some client devices may be configured with embedded functionalities of nodes 102 while other client devices are connected to external pluggable components with functionalities of nodes 102.

In addition, nodes 102 may comprise one or more servers, gateways, or other types of devices forming systems including, but not limited to, edge computing platforms, cloud infrastructure comprising one or more clouds (e.g., one or more public clouds, one or more private clouds, one or more hybrid clouds, combinations thereof, etc.), and/or core computing platforms.

The network 104 may be implemented using multiple networks of different types. For example, the network 104 may comprise a portion of a global computer network such as the Internet, although other types of networks can be part of the network 104 including a wide area network (WAN), a local area network (LAN), a satellite network, a telephone or cable network, a cellular network, a wireless network such as a WiFi or WiMAX network, a storage area network (SAN), or various portions or combinations of these and other types of networks. The network 104 in some embodiments therefore comprises combinations of multiple different types of networks each comprising processing devices configured to communicate using Internet Protocol (IP) or other related communication protocols.

The term "user" herein is intended to be broadly construed so as to encompass numerous arrangements of human, hardware, software or firmware entities, as well as combinations of such entities.

Although not explicitly shown in FIG. 1, one or more input-output devices such as keyboards, displays or other types of input-output devices may be used to support one or more user interfaces to nodes 102, as well as to support communication between nodes 102 and other related systems and devices not explicitly shown. Further, at least portions of the functionality of nodes 102 may be implemented at least in part in the form of software that is stored in memory and executed by a processor.

Nodes 102 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Nodes 102 may be implemented on respective distinct processing platforms, although numerous other arrangements are possible. For example, in some embodiments at least portions of nodes 102 are implemented on the same processing platform, while others of nodes 102 are implemented on other processing platforms.

The term "processing platform" as used herein is intended to be broadly construed so as to encompass, by way of illustration and without limitation, multiple sets of processing devices and one or more associated storage systems that are configured to communicate over one or more networks. For example, distributed implementations of nodes 102 are possible, in which certain ones of nodes 102 reside in a first geographic location while other ones of nodes 102 reside in at least a second geographic location that is potentially remote from the first geographic location. Numerous other distributed implementations of nodes 102 are possible.

Additional examples of processing platforms utilized to implement portions of computing environment 100 in illustrative embodiments will be described in more detail below in conjunction with FIGS. 7 and 8.

It is to be understood that the particular functionalities of nodes 102 are presented by way of illustrative example only and, in other embodiments, additional or alternative functionalities may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

By way of further example, in one illustrative embodiment, nodes 102 may be nodes in a container orchestration platform such as, but not limited to, a Kubernetes framework. Kubernetes is an open-source system for automating application deployment, scaling, and management within a container-based information processing system comprised of components referred to as pods, nodes and clusters, as will be further explained below in the context of FIG. 2. Types of containers that may be implemented or otherwise adapted within the Kubernetes system include, but are not limited to, Docker containers or other types of Linux containers (LXCs) or Windows containers. Kubernetes has become a prevalent container orchestration system for managing containerized workloads. It is rapidly being adopted by many enterprise-based information technology (IT) organizations to deploy their application programs (applications). By way of example only, such applications may include stateless (or inherently redundant applications) and/or stateful applications. Non-limiting examples of stateful applications may include legacy databases such as Oracle, MySQL, and PostgreSQL, as well as other stateful applications that are not inherently redundant. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by a least one manager or administrator node. A Kubernetes environment may include multiple clusters respectively managed by multiple administrator nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod.

While a Kubernetes framework is illustratively described above, it is to be appreciated that alternative embodiments are not limited to any particular container orchestration system. That is, while descriptions of subsequent figures refer to worker nodes and administrator nodes, it is to be understood that these terms are intended to generally refer to any processing or computing devices, physical and/or virtual, and not necessarily limited to the meanings given to them in the context of Kubernetes or other conventional container orchestration frameworks.

Figure 2:
FIG. 2 illustrates a worker node configured to provide virtualized computing resource management for machine learning inference serving according to an illustrative embodiment.
Figure 2:
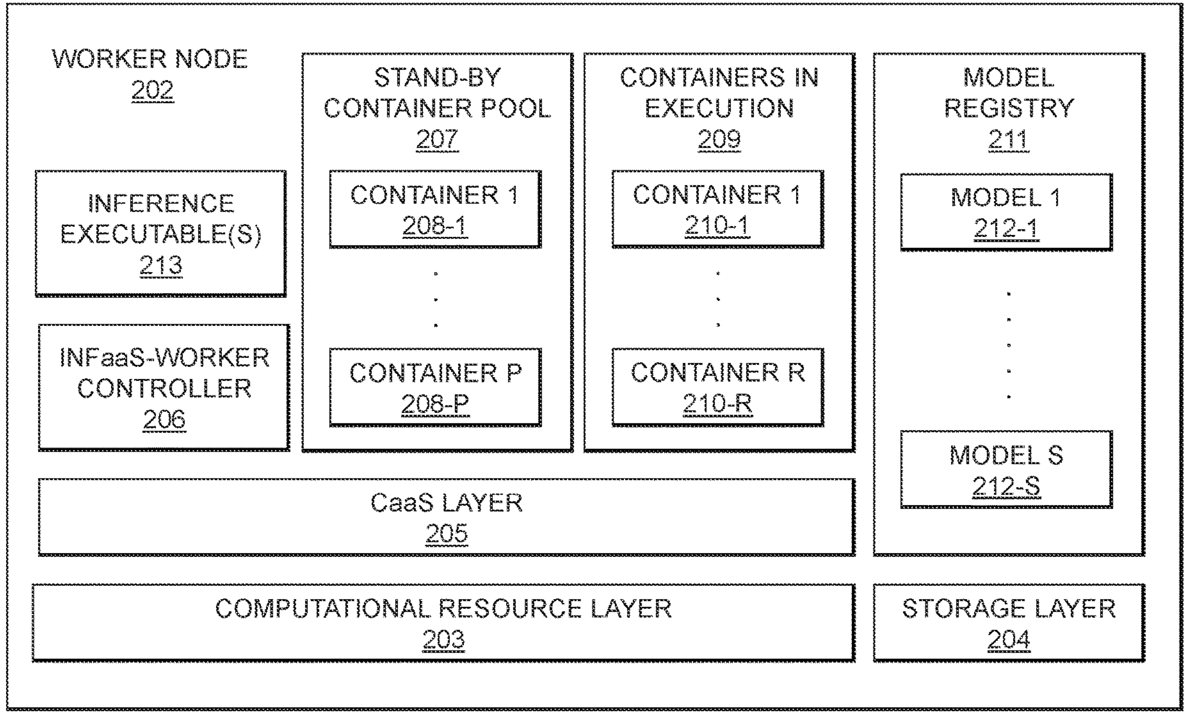

FIG. 2 illustrates an architecture 200 of a worker node 202 configured to provide container management for machine learning inference serving according to an illustrative embodiment. Note that worker node 202 can be considered an example of one or more of nodes 102 in FIG. 1. While a container is the virtualized computing resource being managed in this illustrative embodiment, it is to be understood that other types of virtualized computing resources can be managed in alternative embodiments.

As shown, worker node 202 comprises a computational resource layer 203, a storage layer 204, a Container-as-a-Service (CaaS) layer 205, an INFaaS-worker controller 206, a stand-by container pool 207 with a plurality of stand-by containers 208-1, . . . , 208-P (which may hereinafter be referred to collectively as stand-by containers 208, and individually as stand-by container 208), a set of containers in execution 209 with a plurality of execution containers 210-1, . . . , 210-R (which may hereinafter be referred to collectively as execution containers 210, and individually as execution container 210), and a model registry 211 with a plurality of models 212-1, . . . , 212-S (hereinafter referred to collectively as models 212, and individually as model 212). Models 212 are ML models such as, but not limited to DNN models. Also shown in worker node 202 are one or more inference executables 213 (which may hereinafter be referred to as inference executables 213 or inference executable 213) which are sets of executable code that run the inference for respective ML models within execution containers 210. As will be explained below, worker node 202 may be configured with multiple inference executables 213.

In some embodiments, computational resource layer 203 comprises physical resources deployed on and/or otherwise available to worker node 202 such as, but not limited to, CPU, random-access memory, accelerators, etc., while storage layer 204 comprises storage devices deployed on and/or otherwise available to worker node 202 such as, but not limited to, hard disk drives, flash drives, arrays of drives, etc. CaaS layer 205 comprises conventional container orchestration functionalities such as may be provided by a Kubernetes framework or the like.

INFaaS-worker controller 206, as further explained herein, enables a warm-up or pre-warming of one or more containers for inference serving purposes such that, when one or more triggers are invoked, serving functions are ready to accept input and start serving or at least are further along in the process due to the warm-up then they would have been without the warm-up. This container warm-up mechanism can reduce time to handle inference serving requests of an INFaaS platform.

It is to be appreciated that in one or more illustrative embodiments INFaaS-worker controller 206 is software deployed to each worker node within an INFaaS cluster. Thus, in an illustrative Kubernetes-based embodiment, each worker node in a cluster is configured to have INFaaS-worker controller functionalities to provide container orchestration in conjunction with the CaaS layer 205 and to coordinate stand-by containers 208 and execution containers 210 with computational resources as needed. INFaaS-worker controller 206 is also responsible for managing model registry 211 which provides caching for models 212 (e.g., DNN models) within worker node 202.

As mentioned above, inference executable 213 is the actual executable that runs the inference for a given one of models 212. For a general-purpose FaaS platform, developers can upload many different container images and functions. For INFaaS, developers can select models 212 (e.g., one or more DNN models) from model registry 211 to be executed, and thus a relatively small number of implementations of inference executables 213 are sufficient (as evident in examples below). In some embodiments, these inference executables can be provided by INFaaS platform providers, so that developers do not need to spend time implementing them. Furthermore, with a relatively small number of inference executables, the coding of each inference executable can be further optimized by implementation in low-level languages such as, but not limited to, C, C++, Golang, etc. By having only a relatively small number of execution environments, the number of container images managed by INFaaS-worker controller 206 is also relatively small which is advantageous for container pooling, as will be described further herein.

For example, if a container pool (e.g., stand-by container pool 207) were to be implemented for a general-purpose FaaS that is deployed with 1,000,000 different functions and each function were to be warmed-up with at least one instance, then it would require 1,000,000 containers sitting in FaaS-worker nodes taking up a significant amount of computational resources. Since the container image for inference executable 213 can be unified into a relatively small number of container images, INFaaS-worker controller 206 can warm-up a given number of the same inference containers (e.g., stand-by containers 208) based on traffic volume. Further, based on the worker node architecture (e.g., x86, ARM, etc.) and accelerators available (e.g., GPU, FPGA, AI-Chip, etc.), the corresponding inference-executable container images can be downloaded to the worker node (e.g., worker node 202).

Figure 5:
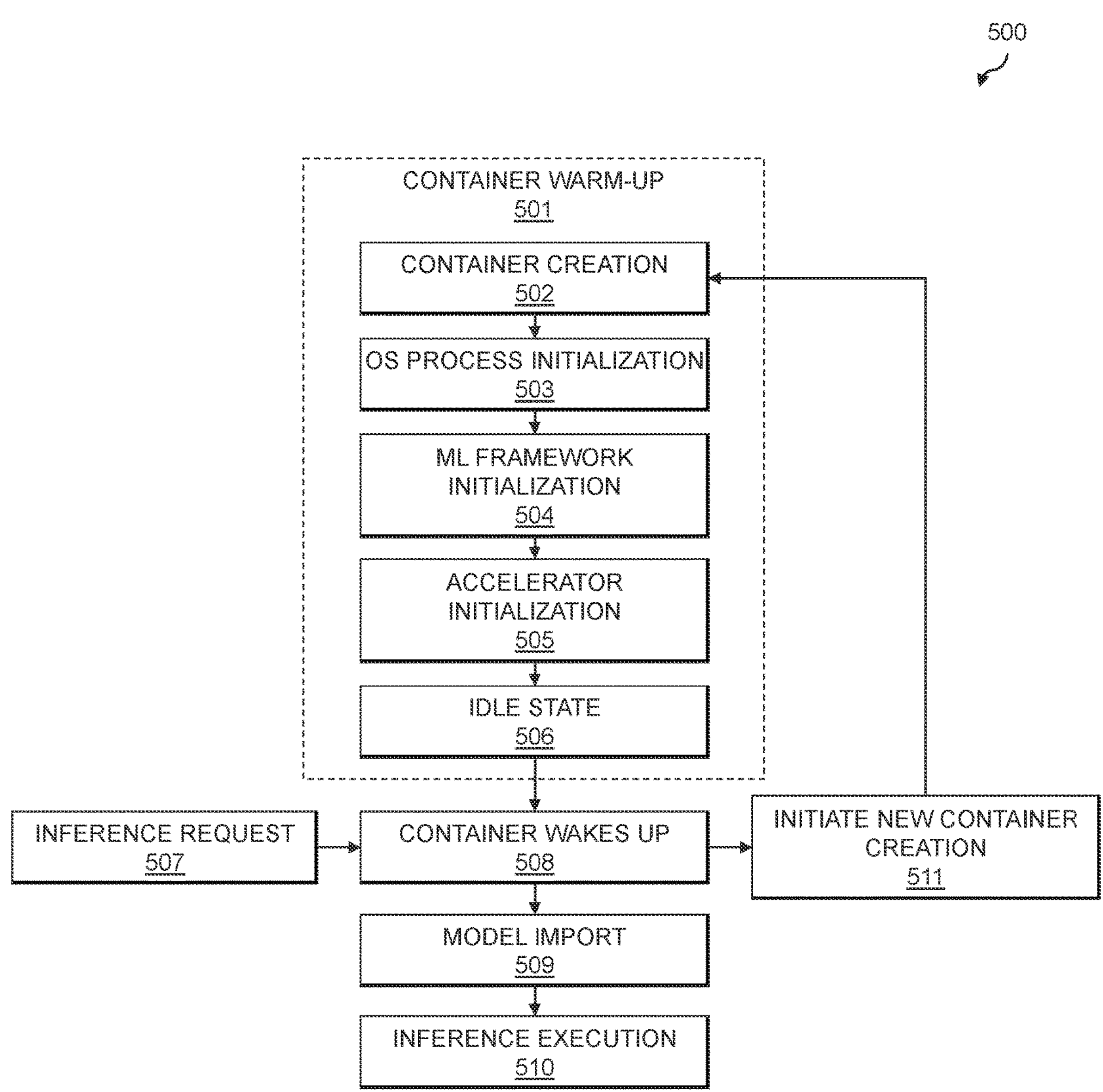
FIG. 5 illustrates a process in an orchestration architecture to provide virtualized computing resource management for machine learning inference serving according to an illustrative embodiment.

Given architecture 200 of worker node 202, an end-to-end process for providing container management according to one or more illustrative embodiments will be explained below with reference to a process 500 in FIG. 5.

Figure 3:
FIG. 3 illustrates an orchestration architecture configured to enable virtualized computing resource management for machine learning inference serving according to an illustrative embodiment.
Figure 3:
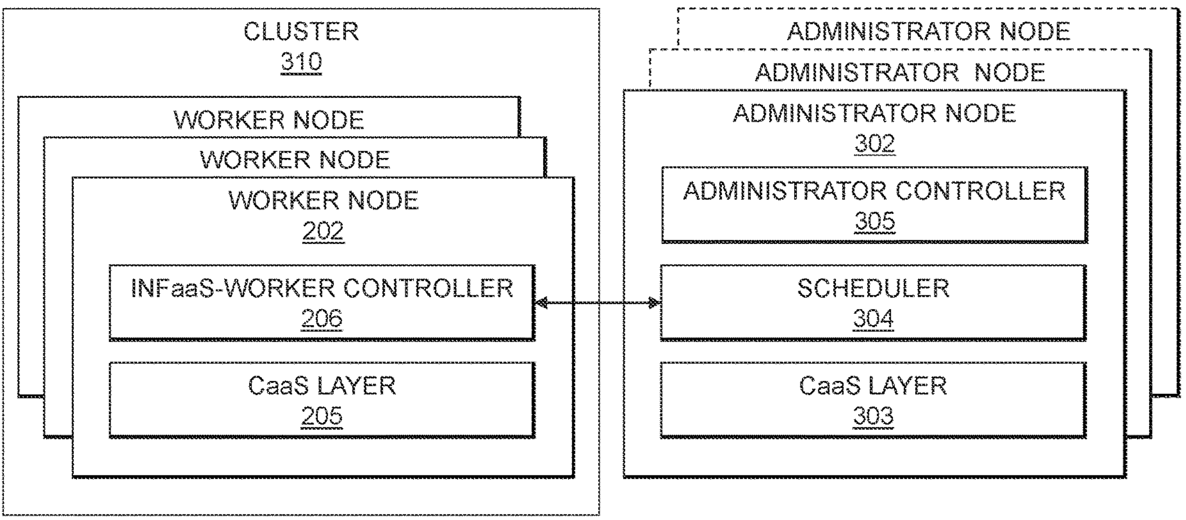

As a pre-requisite to process 500, it is assumed that a CaaS platform (e.g., Kubernetes), e.g., CaaS layer 205, and INFaaS-worker controller functionality, e.g., INFaaS-worker controller 206, are installed on each INFaaS worker node. Recall that FIG. 1 illustrates multiple nodes 102, some of which may be worker nodes and some of which may be administrator nodes. The worker nodes and administrator nodes operate together as part of a larger INFaaS platform. It is therefore assumed that one or more administrator nodes are in-place to orchestrate requests to different worker nodes. This arrangement is depicted in FIG. 3 as node orchestration architecture 300. For example, as shown, a plurality of worker nodes 202 are operatively coupled to one or more administrator nodes 302. As summarily shown, each worker node 202 is configured with CaaS layer 205 and INFaaS-worker controller 206, as explained above. Each of the one or more administrator nodes 302 comprise a CaaS layer 303, a scheduler 304, and an administrator controller 305. In a Kubernetes-based embodiment, CaaS layer 303, scheduler 304, and administrator controller 305 provide cluster management functionalities (e.g., control, scheduling, API services, key-value database, etc.) with respect to worker nodes 202. Note that worker nodes 202 form a cluster 310. It is to be appreciated that more than one cluster (not expressly shown) can be managed by a given administrator node 302.

Given the above assumptions, at runtime, stand-by container pool 207 is warmed up (pre-warmed, pre-warmed up, and the like), as will now be explained. This is depicted as container warm-up 501 in process 500.

Figure 4:
FIG. 4 illustrates a data structure maintained at a worker node configured to provide virtualized computing resource management for machine learning inference serving according to an illustrative embodiment.

In one or more illustrative embodiments, INFaaS-worker controller 206 comprises a data structure, e.g., table 400 in FIG. 4, that specifies for each inference executable 213 the desired number of stand-by containers 208 warmed up in stand-by container pool 207. This number can be static or dynamically calculated based on available computational resources and traffic volume. By way of example, as shown in table 400, twenty stand-by containers are to be warmed up for a TensorFlow 2.0-based container image, eight for a TensorFlow 2.0 with a GPU-based container image, and thirteen for a PyTorch-based container image. As is known, TensorFlow and PyTorch are commercially available deep learning frameworks with which a Kubernetes orchestration system can be integrated. However, it is to be understood that embodiments are not limited to any particular ML framework or container orchestration framework. Accordingly, INFaaS-worker controller 206 runs inference executable 213 for N instances of each container image, according to table 400.

When creating the containers, in step 502, model registry 211 (e.g., a file directory in one or more illustrative embodiments) is mounted to the container in some embodiments, so that the container can obtain models 212 quickly without the additional overhead of dynamic mounting.

In step 503, container process initialization on the operating system of the computing platform is performed, e.g., control group initialization in a Linux kernel.

In step 504, ML frameworks are initialized. Each inference executable 213 is implemented differently in terms of its corresponding ML framework, resource (CPU, accelerator) dependency, ML model format, etc. However, regardless of the particular ML framework, when an inference executable container is warming up, it is assumed that all necessary libraries required by the corresponding ML framework are loaded. By way of example, some ML frameworks can take over one second to initialize.

In step 505, accelerators are initialized. For example, after the ML framework is loaded in step 504, any required accelerators are loaded in step 505. Based on the programming language, ML framework and accelerator, this step may take about one second as well (e.g., 0.8 seconds for NVIDIA and CUDA implementations). For some combinations of ML frameworks and accelerators, it may be useful for the inference executable 213 to create a placeholder (dummy) session, so that the container process is registered on the accelerator memory space.

An idle (stand-by) state is then entered in step 506. At this point, the container is warmed up and can await further instructions from administrator node 302 to process the inference. By these stand-by containers entering an idle state, they do not take up computation cycles from the CPU or accelerators. It is desirable for these containers to be able to wake up quickly, e.g., within about 10 milliseconds.

Illustrative embodiments may utilize a variety of mechanisms to create this idle state or stand-by type of behavior. For example, in a Linux implementation, the inference executable process can enter a blocking state (e.g., using Linux pipes). At this stage, the container occupies a minimum amount of memory space in both main memory space and accelerator memory space and does not consume any (or any significant or appreciable) computation cycles on the CPU and GPU. INFaaS-worker controller 206 keeps track of each stand-by container 208 within stand-by container pool 207, as well as the mechanism to wake them (e.g., Linux pipes for each container).

Next, when administrator node 302 receives inference request in step 507, it is assumed the request contains both the input (e.g., a file pointer to the input data) and a model identifier (ID). The administrator node 302 utilizes its scheduler 304 and delegates the request to INFaaS-worker controller 206 running in one of worker nodes 202 of cluster 310 (recall FIG. 3).

Upon receipt of the inference request from scheduler 304, INFaaS-worker controller 206 wakes up, in step 508, at least one stand-by container 208 in stand-by container pool 207 that is capable of executing the ML model identified in the inference request. The mechanism of waking up the container depends on the idling mechanism. For example, for Linux pipes, INFaaS-worker controller 206 writes to the corresponding pipe and the container is woken up within about one millisecond. At this point, the start time of the inference serving container concludes.

In step 509, the ML model is imported. More particularly, while waking up the container, INFaaS-worker controller 206 also determines if the ML model is already available in model registry 211. If it is, INFaaS-worker controller 206 attaches the location of the ML model. If the model does not yet exist in model registry 211, INFaaS-worker controller 206 downloads the ML model from an external source and extracts the ML model. Note that the term waking up a container herein refers to the process of removing a one of stand-by containers 208 from the idle state. The woken container is then considered part of the execution containers 210 in set of containers in execution 209.

In step 510, inference executable 213 opens the ML model and imports the ML model into the ML framework and runs the inference with the input from the request. Depending on the size of the ML model and the ML framework, the time it takes to complete this step will vary and is not necessarily calculated as part of the start time.

In step 511, continuous refreshing of stand-by container pool 207 is performed. More particularly, when a stand-by container 208 is woken from stand-by container pool 207, INFaaS-worker controller 206 starts to warm-up another container to replenish container pool 207. In some embodiments, INFaaS-worker controller 206 makes a best effort to ensure the actual number of containers within stand-by container pool 207 is at or as close to the desired number in table 400 as possible.

It is to be appreciated that without the stand-by container pooling functionality described herein, the conventional end-to-end process does not begin until the inference request is received and needs to be executed starting from container creation, which will likely be over 1.5 seconds between the inference request and the model import step. In contrast, with the stand-by container pooling functionality described herein and as illustratively described above in the context of process 500 of FIG. 5, the container will be warmed-up and enter a stand-by container pool. Upon receipt of the inference request, the container can be woken relatively quickly, e.g., within about one millisecond, down from 1.5 seconds in the conventional process.

It is to be further appreciated that while a worker node 202 is depicted in the figures as having a stand-by container pool 207, a set of containers in execution 209, and a model registry 211 implemented thereon, in alternative embodiments, one or more of stand-by container pool 207, set of containers in execution 209, and model registry 211, or parts thereof, can be implemented remote from worker node 202. Further, multiple worker nodes 202 may be able to access and/or utilize the same stand-by container pool 207, set of containers in execution 209, and model registry 211.

By way of further advantage, in edge computing environments wherein computational resources are scarce, illustrative embodiments reduce the time to inference serve. By way of example only, an illustrative embodiment can be comprised of a single node platform deployed to far-edge infrastructure such as, but not limited to, NVIDIA Jetson, RPi, etc. Due to the restriction of resources in these environments, it may be impractical to execute inference serving as long-running microservices. Illustrative embodiments therefore help to reduce the timeframe of inference function start so that, inter alia, resources can be used more efficiently.

Figure 6:
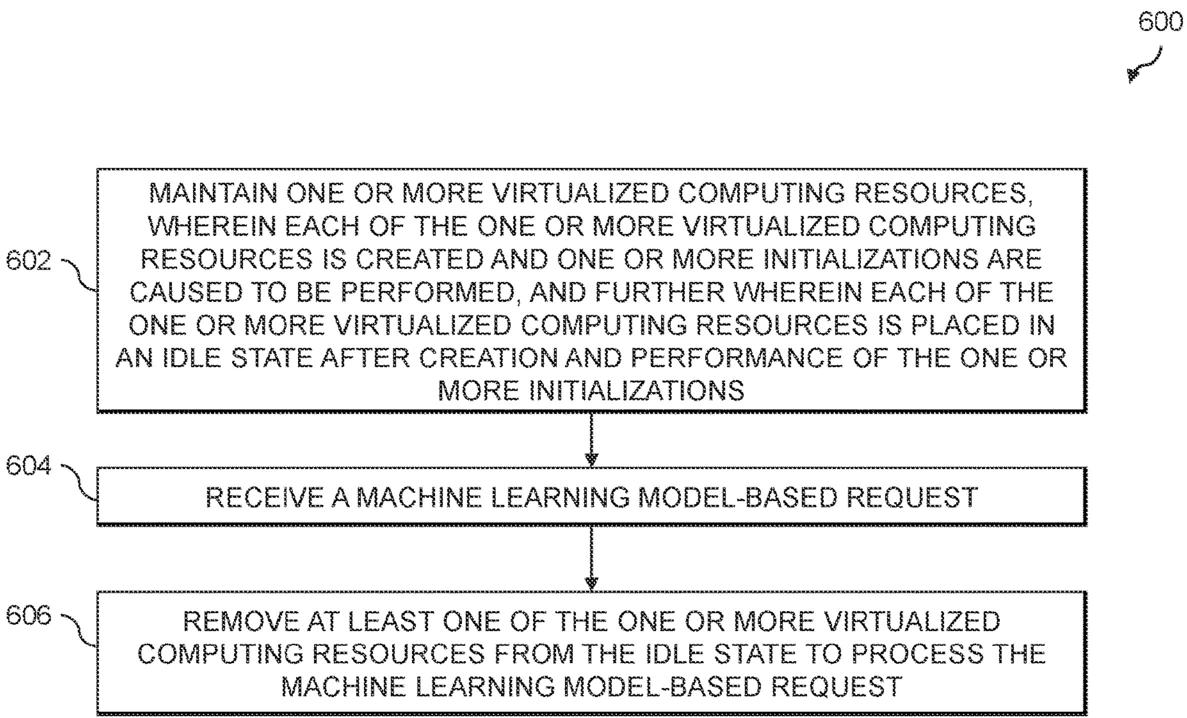
FIG. 6 illustrates a virtualized computing resource management methodology for machine learning inference serving according to an illustrative embodiment.

Turning now to FIG. 6, a virtualized computing resource management methodology 600 for machine learning model-based processing functionality in a computing environment is shown. Step 602 maintains one or more virtualized computing resources. Each of the one or more virtualized computing resources is created and one or more initializations are caused to be performed, and each of the one or more virtualized computing resources is placed in an idle state after creation and performance of the one or more initializations. Step 604 receives a machine learning model-based request. Step 606 removes at least one of the one or more virtualized computing resources from the idle state to process the machine learning model-based request.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement virtualized computing resource management functionalities will now be described in greater detail with reference to FIGS. 7 and 8. Although described in the context of computing environment 100, these platforms may also be used to implement at least portions of other information processing systems in other embodiments.

Figure 7:
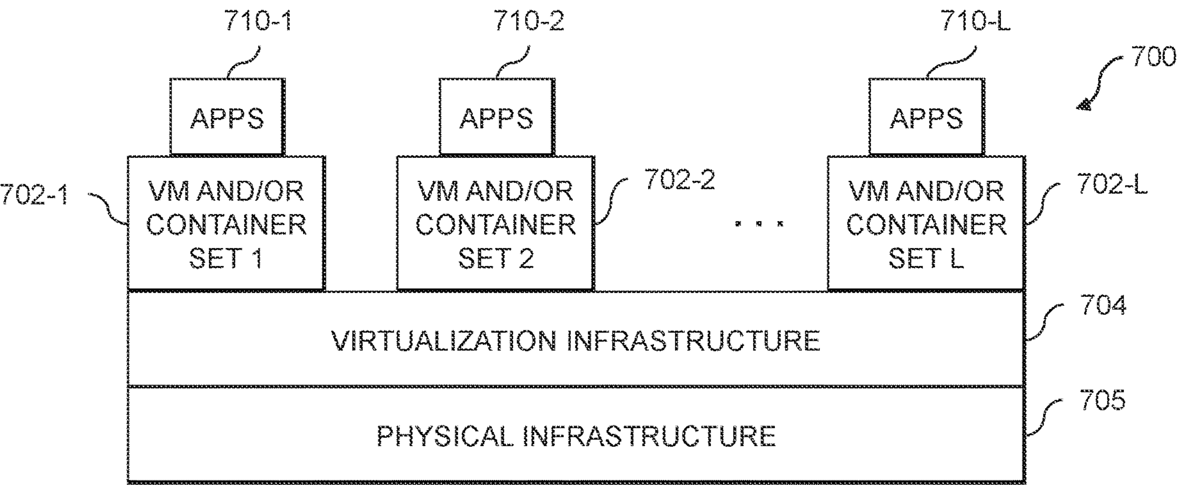
FIGS. 7 and 8 illustrate examples of processing platforms that may be utilized to implement at least a portion of an information processing system in illustrative embodiments.
Figure 8:
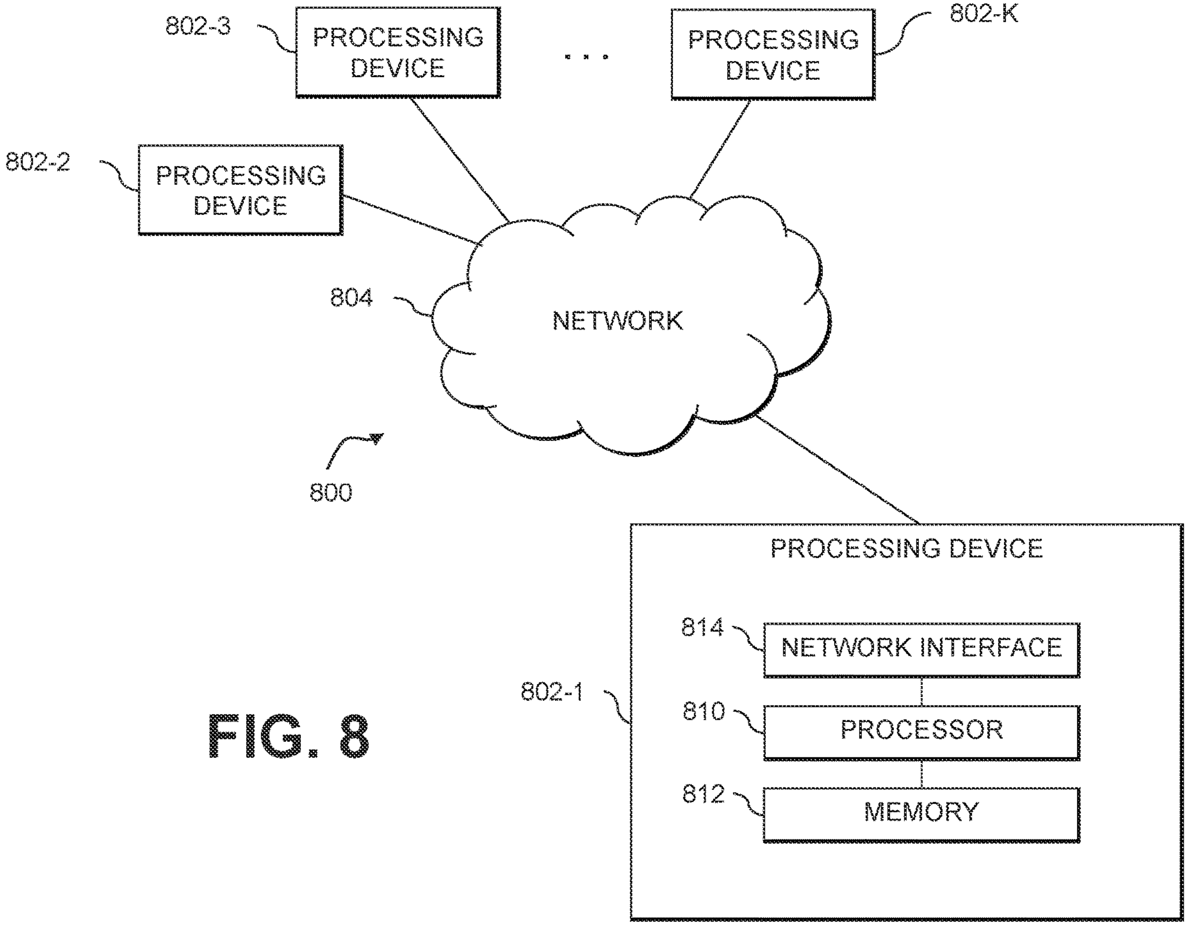

FIG. 7 shows an example processing platform comprising infrastructure 700. The infrastructure 700 comprises a combination of physical and virtual processing resources that may be utilized to implement at least a portion of computing environment 100 in FIG. 1. The infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of computing environment 100 may each run on a computer, server, storage device or other processing platform element. A given such element may be viewed as an example of what is more generally referred to herein as a "processing device." The infrastructure 700 shown in FIG. 7 may represent at least a portion of one processing platform. Another example of such a processing platform is processing platform 800 shown in FIG. 8.

The processing platform 800 in this embodiment comprises a portion of computing environment 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and computing environment 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for managing virtualized computing resources as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, hardware, fabric connections, services, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

determining a given number of virtualized computing resources to maintain in an idle state in a system, wherein the given number of virtualized computing resources to maintain in an idle state is determined based on available computational resources and traffic volume of the system;

maintaining the given number of the virtualized computing resources in an idle state in a standby pool of the system, wherein maintaining comprises creating the given number of virtualized computing resources, and performing initialization operations for each of the virtualized computing resources created, wherein the initialization operations comprise:

initializing a given virtualized computing resource on an operating system of a compute node of the system;

initializing a machine learning framework for use by the given virtualized computing resource;

initializing a hardware accelerator processing device for use by the given virtualized computing resource, wherein initializing the hardware accelerator processing device comprises creating a placeholder session to register the given virtualized computing resource on a memory space of the hardware accelerator processing device; and initializing the given virtualized computing resource into an idle state;

receiving a machine learning model-based request; and in response to receiving the machine learning model-based request:

waking up and removing from the standby pool one or more of the virtualized computing resources from the idle state to process the machine learning model-based request; and creating and initializing one or more new virtualized computing resources into an idle state to replace the virtualized computing resources removed from the standby pool;

wherein the method is performed by at least one processor accessing and executing program instructions stored in at least one memory.

2. The method of claim 1, wherein the machine learning model-based request comprises an inference serving request.

3. The method of claim 2, further comprising processing the inference serving request by:

loading a trained machine learning model;

processing input associated with the inference serving request using the trained machine learning model; and returning a result of the input processing by the trained machine learning model.

4. The method of claim 1, wherein creating the given number of virtualized computing resources comprises:

creating a given virtualized computing resource; and mounting a model registry to the given virtualized computing resource, the model registry comprising a directory of one or more machine learning models.

5. The method of claim 1, wherein initializing the machine learning framework for use by the given virtualized computing resource comprises loading a plurality of machine learning libraries associated with the machine learning framework.

6. The method of claim 1, wherein the virtualized computing resources comprise containers.

7. The method of claim 6, wherein the at least one processor and the at least one memory comprises a worker node in a container orchestration framework.

8. The method of claim 7, wherein the worker node is part of an edge computing platform.

9. An apparatus, comprising:

at least one processor and at least one memory storing computer program instructions wherein, when the at least one processor executes the computer program instructions, the apparatus is configured to:

determine a given number of virtualized computing resources to maintain in an idle state in a system, wherein the given number of virtualized computing resources to maintain in an idle state is determined based on available computational resources and traffic volume of the system;

maintaining the given number of the virtualized computing resources in an idle state in a standby pool of the system, wherein maintaining comprises creating the given number of virtualized computing resources, and performing initialization operations for each of the virtualized computing resources created, wherein the initialization operations comprise:

initializing a given virtualized computing resource on an operating system of a compute node of the system;

initializing a machine learning framework for use by the given virtualized computing resource;

initializing a hardware accelerator processing device for use by the given virtualized computing resource, wherein initializing the hardware accelerator processing device comprises creating a placeholder session to register the given virtualized computing resource on a memory space of the hardware accelerator processing device; and initializing the given virtualized computing resource into an idle state;

receive a machine learning model-based request; and in response to receiving the machine learning model-based request:

wake up and remove from the standby pool one or more of the virtualized computing resources from the idle state to process the machine learning model-based request; and create and initialize one or more new virtualized computing resources into an idle state to replace the virtualized computing resources removed from the standby pool.

10. The apparatus of claim 9, wherein the machine learning model-based request comprises an inference serving request.

11. The apparatus of claim 10, wherein in processing the inference serving request the apparatus is configured to:

load a trained machine learning model;

process input associated with the inference serving request using the trained machine learning model; and return a result of the input processing by the trained machine learning model.

12. The apparatus of claim 9, wherein:

creating the given number of virtualized computing resources comprises creating a given virtualized computing resource, and mounting a model registry to the given virtualized computing resource, the model registry comprising a directory of one or more machine learning models; and initializing the machine learning framework for use by the given virtualized computing resource comprises loading a plurality of machine learning libraries associated with the machine learning framework.

13. The apparatus of claim 9, wherein:

the virtualized computing resources comprise containers;

the at least one processor and the at least one memory comprises a worker node in a container orchestration framework; and the worker node is part of an edge computing platform.

14. The apparatus of claim 9, wherein the virtualized computing resources comprise containers.

15. A computer program product stored on a non-transitory computer-readable medium and comprising machine executable instructions, the machine executable instructions, when executed, causing a processing device to perform steps of:

determining a given number of virtualized computing resources to maintain in an idle state in a system, wherein the given number of virtualized computing resources to maintain in an idle state is determined based on available computational resources and traffic volume of the system;

maintaining the given number of the virtualized computing resources in an idle state in a standby pool of the system, wherein maintaining comprises creating the given number of virtualized computing resources, and performing initialization operations for each of the virtualized computing resources created, wherein the initialization operations comprise:

initializing a given virtualized computing resource on an operating system of a compute node of the system;

initializing a machine learning framework for use by the given virtualized computing resource;

initializing a hardware accelerator processing device for use by the given virtualized computing resource, wherein initializing the hardware accelerator processing device comprises creating a placeholder session to register the given virtualized computing resource on a memory space of the hardware accelerator processing device; and initializing the given virtualized computing resource into an idle state;

receiving a machine learning model-based request; and in response the receiving the machine learning model-based request:

waking up and removing from the standby pool one or more of the virtualized computing resources from the idle state to process the machine learning model-based request; and creating and initializing one or more new virtualized computing resources into an idle state to replace the virtualized computing resources removed from the standby pool to process the machine learning model-based request.

16. The computer program product of claim 15, wherein the machine learning model-based request comprises an inference serving request.

17. The computer program product of claim 16, further comprising processing the inference serving request by:

loading a trained machine learning model;

processing input associated with the inference serving request using the trained machine learning model; and returning a result of the input processing by the trained machine learning model.

18. The computer program product of claim 15, wherein:

creating the given number of virtualized computing resources comprises creating a given virtualized computing resource, and mounting a model registry to the given virtualized computing resource, the model registry comprising a directory of one or more machine learning models; and initializing the machine learning framework for use by the given virtualized computing resource comprises loading a plurality of machine learning libraries associated with the machine learning framework.

19. The computer program product of claim 15, wherein the virtualized computing resources comprise containers.

20. The computer program product of claim 19, wherein the processing device comprises a worker node in a container orchestration framework.

* * * * *